US012487769B2

(12) United States Patent
Suzuki et al.

(10) Patent No.: US 12,487,769 B2
(45) Date of Patent: Dec. 2, 2025

(54) ACCELERATION SECONDARY USE OF DATA

(71) Applicant: HITACHI, Ltd., Tokyo (JP)

(72) Inventors: Takanobu Suzuki, San Jose, CA (US); Tomohiro Kawaguchi, Santa Clara (CA); Akiyoshi Tsuchiya, San Jose (CA)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/207,950

(22) Filed: Jun. 9, 2023

(65) Prior Publication Data

US 2024/0411474 A1 Dec. 12, 2024

(51) Int. Cl.
*G06F 12/08* (2016.01)
*G06F 3/06* (2006.01)
*G06F 12/0808* (2016.01)
*G06F 12/0815* (2016.01)

(52) U.S. Cl.
CPC .......... *G06F 3/0652* (2013.01); *G06F 3/0665* (2013.01); *G06F 3/0683* (2013.01); *G06F 3/0604* (2013.01)

(58) Field of Classification Search
CPC ..... G06F 3/0652; G06F 3/0665; G06F 3/0683
USPC ....................................................... 711/154
See application file for complete search history.

(56) References Cited

U.S. PATENT DOCUMENTS

| | | | | |
|---|---|---|---|---|
| 8,612,776 B2* | 12/2013 | Hakamata | ............ | G06F 21/805 713/193 |
| 8,683,152 B2* | 3/2014 | Kulkarni | ............... | G06F 3/0647 711/E12.103 |
| 10,176,212 B1* | 1/2019 | Prohofsky | ............ | G06F 16/2365 |
| 10,877,868 B2* | 12/2020 | Diaconu | ............ | G06F 11/1471 |
| 10,936,243 B2* | 3/2021 | Tsuchiya | ................. | G06F 3/067 |
| 11,263,039 B2* | 3/2022 | Soman | ................. | G06F 9/45558 |
| 2004/0044826 A1* | 3/2004 | Dawson | ................. | G06F 3/0607 711/4 |
| 2005/0182769 A1* | 8/2005 | Fujita | ..................... | G06F 3/0623 |
| 2009/0265511 A1* | 10/2009 | Fujita | ..................... | G06F 3/0629 711/170 |
| 2009/0276771 A1* | 11/2009 | Nickolov | ............ | H04L 67/1029 718/1 |
| 2010/0057990 A1* | 3/2010 | Mizuno | ................. | G06F 3/0685 711/170 |
| 2010/0281211 A1* | 11/2010 | Ooigawa | ................. | G06F 16/10 711/E12.098 |
| 2013/0318196 A1* | 11/2013 | Yamamoto | .......... | G06F 12/0893 709/215 |
| 2015/0006237 A1* | 1/2015 | Beck | .................. | G06Q 10/0633 705/7.27 |

(Continued)

FOREIGN PATENT DOCUMENTS

JP         2004005370 A      1/2001

*Primary Examiner* — Mohamed M Gebril
(74) *Attorney, Agent, or Firm* — Procopio, Cory, Hargreaves & Savitch LLP

(57) ABSTRACT

Systems and methods described herein can involve, for receipt of a write request from a server to a first storage system associated with a mounted volume having an attribute of read only or read/write, the write request processed by a second storage system, the second storage system setting the write destination of write data associated with the write request to the first storage system or the second storage system based on the attribute.

20 Claims, 19 Drawing Sheets

(56) References Cited

U.S. PATENT DOCUMENTS

| | | | |
|---|---|---|---|
| 2015/0089171 A1* | 3/2015 | Fujita | G06F 3/061 |
| | | | 711/162 |
| 2017/0206135 A1* | 7/2017 | Zeng | G06F 11/2094 |
| 2017/0371587 A1* | 12/2017 | Saito | G06F 3/0671 |
| 2018/0089206 A1* | 3/2018 | Tamura | G06F 16/128 |
| 2019/0095132 A1* | 3/2019 | Tatsumi | G06F 3/0641 |
| 2022/0155972 A1* | 5/2022 | Edara | G06F 11/1466 |
| 2022/0166887 A1* | 5/2022 | Kawase | G06F 3/0679 |
| 2022/0283904 A1* | 9/2022 | Chopra | G06F 11/1451 |
| 2024/0338140 A1* | 10/2024 | Reddy | G06F 3/0664 |
| 2024/0411474 A1* | 12/2024 | Suzuki | G06F 3/067 |

* cited by examiner

Remote Volume Catalogue

Remote Volume Catalogue 200-2

| Volume Name 200-2-1 | Capacity [TB] 200-2-2 | Attribute 200-2-3 | Sites 200-2-4 | Storage device 200-2-5 |
|---|---|---|---|---|
| Sales-data | 10 | Read only | 1b | 100b |
| Service-operation-data | 10 | Read only | 1b | 100b |

Cancel  Apply

FIG. 3

| | | | | Service Catalogue | | | | |
|---|---|---|---|---|---|---|---|---|
| | | | | Service Catalogue 200-3 | | | | |
| Service Name 200-3-1 | Unit Price [USD/day] 200-3-2 | Unit Capacity 200-3-3 | Reuse Remote Volume flag 200-3-4 | Remote Volume Name 200-3-5 | Sites 200-3-6 | Storage Device 200-3-7 | Local Pool ID 200-3-8 | Store Read Data Flag 200-3-9 |
| Local | 0.2 | 100GB | No | - | 1a | 100a | 0 | No |
| Sales data Reuse Normal | 30 | 10TB | Yes | Sales-data | 1a | 100a | 0 | No |
| Sales data Reuse Premium | 30 | 10TB | Yes | Sales-data | 1a | 100a | 0 | Yes |
| Service Operation data Reuse Normal | 30 | 10TB | Yes | Service-operation-data | 1a | 100a | 0 | No |
| Service Operation data Reuse Premium | 50 | 10TB | Yes | Service-operation-data | 1a | 100a | 0 | Yes |

Cancel    Apply

FIG. 4

Volume Database 200-4

| ID 200-4-1 | Volume Name 200-4-2 | Type 200-4-3 | Units 200-4-4 | Sites 200-4-5 | Storage Device 200-4-6 | Pool ID 200-4-7 |
|---|---|---|---|---|---|---|
| 0 | Sales-Analysis-0 | Sales data Reuse Premium | 1 | 1a | 100a | 0 |
| 1 | Service-Analysis-0 | Service operation data Reuse Normal | 1 | 1a | 100b | 0 |
| 2 | Production-0 | Local | 8 | 1a | 100a | 0 |

Storage Resource Database 200-5

| Storage Device 200-5-1 | Max Capacity [TB] 200-5-2 | Used Capacity [TB] 200-5-3 | Threshold 200-5-4 | Sites 200-5-5 |
|---|---|---|---|---|
| 100a | 2000 | 1500 | 80% | 1a |

FIG. 6

Volume-Pool Mapping table 100-1

| Volume Name 100-1-1 | Volume Address 100-1-2 | Attribute 100-1-3 | Mapping destination Name 100-1-4 | Mapping destination Type 100-1-5 | Mapping destination address 100-1-6 | Disposable flag 100-1-7 |
|---|---|---|---|---|---|---|
| Sales-Analysis-0 | 0 | Read only | Sales-data | Remote | 0 | No |
| | 1 | Read only | Sales-data | Remote | 1 | No |
| | 2 | Read only | Pool-0 | Local | 2 | Yes |
| | 3 | Read/Write | Pool-0 | Local | 0 | No |
| | 4 | Read only | Pool-0 | Local | unmapped | Yes |
| | : | : | : | : | : | : |
| Service-Analysis-1 | : | : | : | : | : | : |
| Production-0 | 0 | Read/Write | Pool-0 | Local | 3 | No |
| | 1 | Read/Write | Pool-0 | Local | 1 | No |
| | : | : | : | : | : | : |

Pool-Volume Mapping table 100-2

| Pool ID 100-2-1 | Pool Name 100-2-2 | Pool Address 100-2-3 | Volume Name 100-2-4 | Volume Address 100-2-5 | Disposable flag 100-2-6 |
|---|---|---|---|---|---|
| 0 | Pool-0 | 0 | Sales-Analysis-0 | 3 | No |
| | | 1 | Production-0 | 1 | No |
| | | 2 | Sales-Analysis-0 | 4 | Yes |
| | | 3 | Production-0 | 0 | No |
| | | 4 | (unused) | (unused) | (unused) |
| | | : | : | : | : |

FIG. 7

ACCELERATION SECONDARY USE OF DATA

BACKGROUND

Field

The present disclosure is generally directed to storage system, and more specifically, to systems and methods for data access acceleration.

Related Art

Data stored in the cloud system has a variety of use cases, such as recovery from backups, analysis, testing, rehosting from on-premise data centers, and so on. In these use cases, it can be important to retain the data at the time of store and make it available quickly and easily.

There are various reasons for retaining data. For example, many users often run their applications which uses the same data source with others simultaneously, and applications run on the premise that the data stored in the cloud systems is always the same as it was at the time of storage. Retaining data also facilitates business scalability and durability. Further, with the recent popularization of cloud services, users who are not experts of storage devices use storage devices by themselves to do these use cases.

In a related art implementation, there is a method to connect a first storage device with a second storage device. This related art implementation allows users of a first storage device to read/write data in a second storage device instantly through a first storage device.

In another related art implementation, there is a method to connect and copy data to a volume in a first storage device from a snapshot of a volume in a second storage device. This related art implementation allows users to access data in a second storage system through a first storage without waiting for the data copy to finish. In such related art implementations, the first storage handles I/O request as follows. For read operations, if data has already been copied, the systems transfer data in a first storage. If data has not been copied yet, a first storage reads data from a second storage. For write operations, the related art implementation keeps write data in a first storage.

SUMMARY

Related art implementations allow users to instantly access to the data in a second storage device, but such methods will modify data in a second storage device.

Related art implementations also allow users to instantly access without modifying data, but it needs to take a snapshot of a target volume. Taking a snapshot before accessing data can be difficult for non-experts of storage devices.

Accordingly, there is a need for storage devices to provide functions or solutions that enable users to instant and easy access to data in the other storage devices without modifying data.

Related art implementations allow users to instant and easy access to data in the other storage devices without modifying data by determining the destination of write data based on volume attributes.

Aspects of the present disclosure can involve a method, which can include, for receipt of a write request from a server to a first storage system associated with a mounted volume having an attribute of read only or read/write, the write request processed by a second storage system: the second storage system setting a write destination of write data associated with the write request to the first storage system or the second storage system based on the attribute.

Aspects of the present disclosure can involve a computer program, storing instructions for executing a process, which can include for receipt of a write request from a server to a first storage system associated with a mounted volume having an attribute of read only or read/write, the write request processed by a second storage system: setting a write destination of write data associated with the write request to the first storage system or the second storage system based on the attribute. The computer program and instructions can be stored on a non-transitory computer readable medium and executed by one or more processors.

Aspects of the present disclosure can involve a system, which can include a first storage system configured to receive a write request from a server, the write request associated with a mounted volume having an attribute of read only or read/write; and a second storage system, involving a processor, configured to: process the write request for the first storage system; and set a write destination of write data associated with the write request to the first storage system or the second storage system based on the attribute.

BRIEF DESCRIPTION OF DRAWINGS

FIG. 3 illustrates an example screen interface that Storage Management Service displays to storage provider for Remote Volume Registration, in accordance with an example implementation.

FIG. 4 illustrates an example screen interface that Storage Management Service displays to storage provider for Service Catalogue Setting, in accordance with an example implementation.

FIG. 6 illustrates example databases for managing information on storage system configurations and resources managed by the storage service, in accordance with an example implementation.

FIG. 7 illustrates tables for managing information of the mapping between the volume address and the location of data, in accordance with an example implementation.

DETAILED DESCRIPTION

Figure 1A:
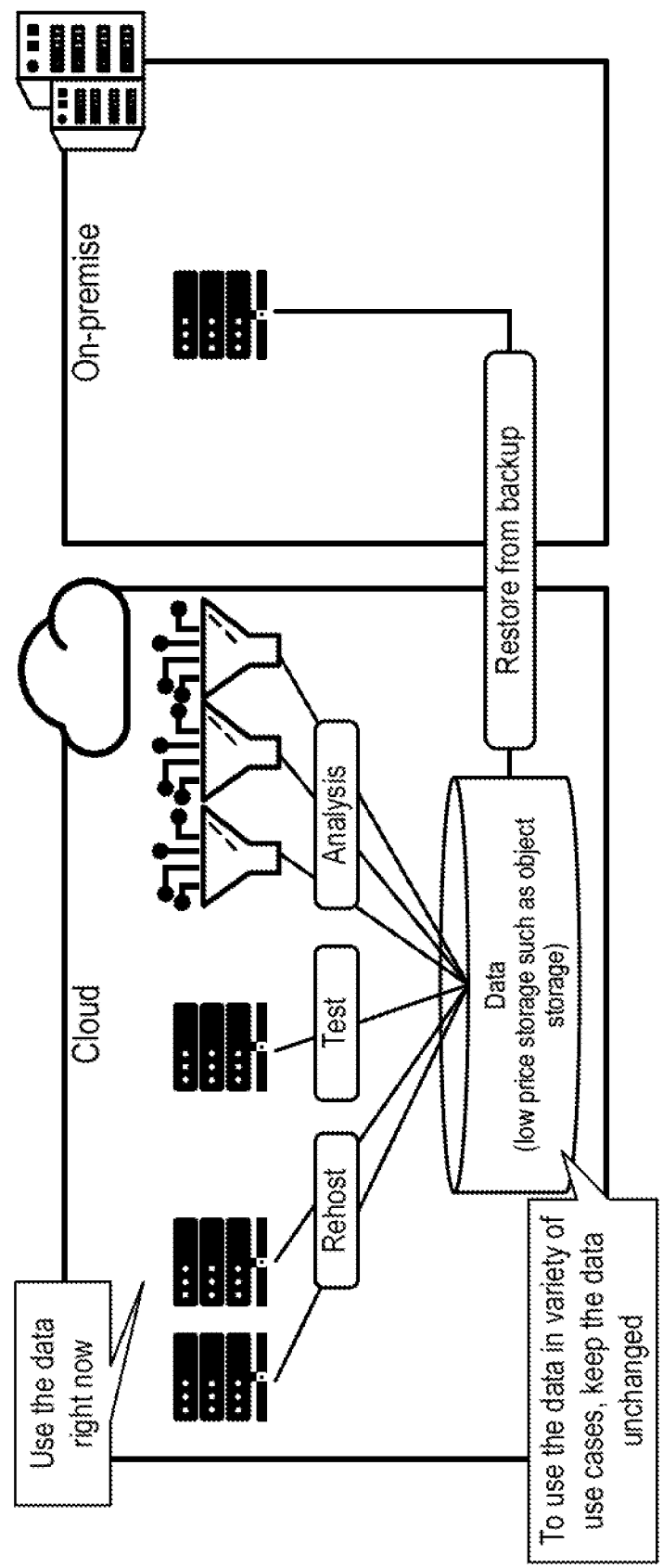
FIG. 1(A) illustrates an example interaction with cloud and on-premise.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1(A) illustrates an example interaction with cloud and on-premise. Data stored in the cloud has various use cases, including recovery from backup, secondary use in analysis and testing, and re-hosting to the cloud (e.g., migrating a system as it is from on-premise). For these use cases, it can be necessary to retain the data at the point of storage while making it available for quick use. The data stored in the storage (e.g., low price storage such as object storage) needs to maintain the data as unchanged so that the data can be used in a variety of use cases.

Figure 1B:
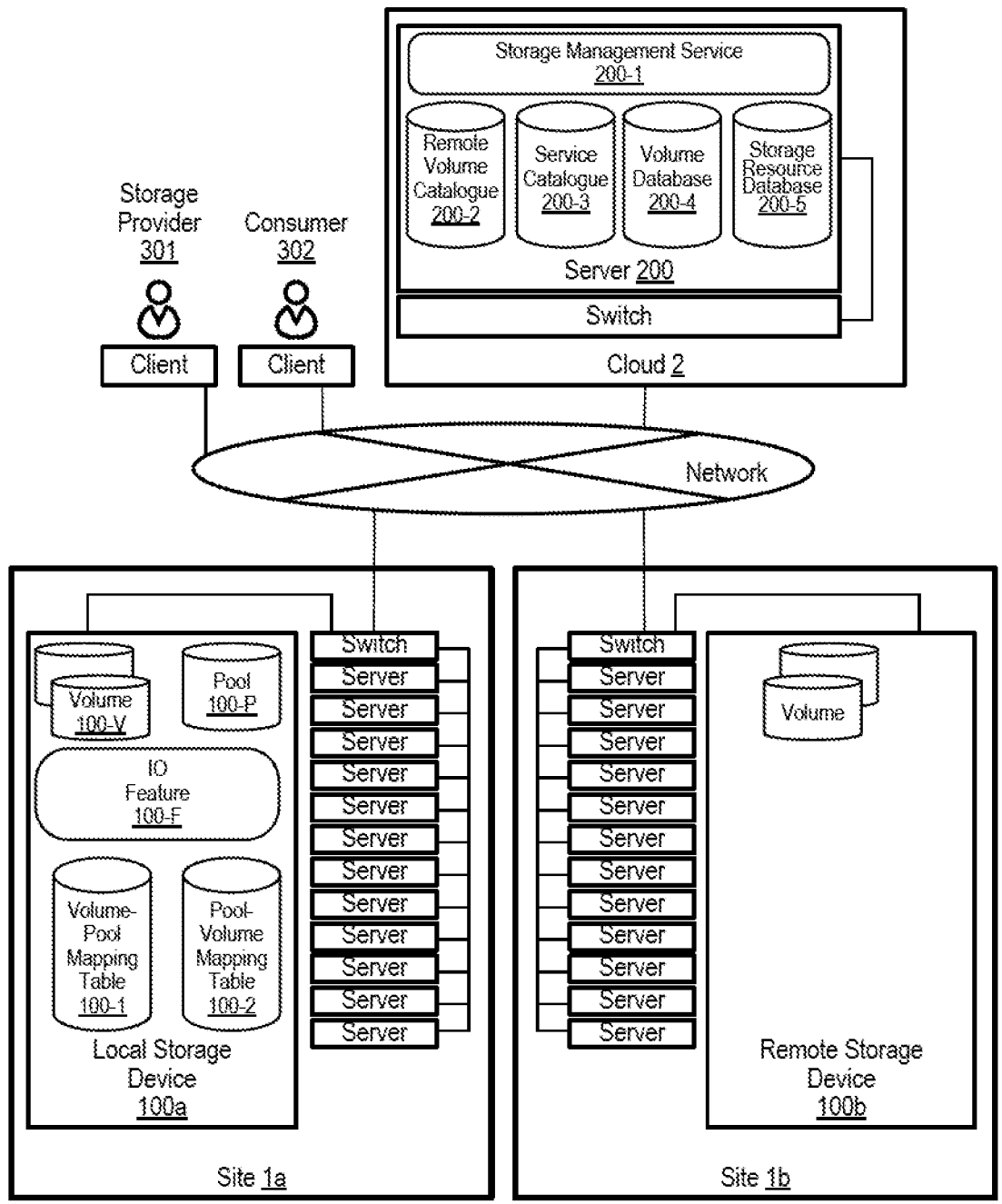
FIG. 1(B) illustrates the overall system structure, in accordance with an example implementation.

FIG. 1(B) illustrates the overall system structure, in accordance with an example implementation. The system includes multiple sites 1a, 1b and Cloud 2. These systems connect to each other via network (e.g. internet). Storage provider 301 manages the system for providing storage services, and consumer 302 operates the storage services over network. The storage service application, which provides storage services at sites 1a and 1b, runs on Cloud 2.

Cloud 2 can involve a server 200 to manage the storage service application. The storage service application can involve storage management service 200-1 and databases as follows. Remote Volume Catalogue 200-2 stores a list of remote volumes that will be reused. Service Catalogue 200-3 stores a list of services and their settings provided by provider 301 to consumer 302. Volume Database 200-4 stores a list of volumes provided by the local storage devices. Storage Resource Database 200-5 stores a list of resources that Local Storage Device 100a can provide.

Site 1a and 1b are connected by a network (e.g. Wide Area Network). Each site has computer servers and switches. Site 1a has Local Storage Device 100a, and Site 1b has Remote Storage Device 100b. These are connected by LAN (Local Area Network) and/or SAN (Storage Area Network).

Depending on the desired implementation, some virtual machines, containers, and applications run on servers and their data is stored on Local Storage Device 100a. Local storage device 100a has an Input/Output (I/O) feature 100-F for volumes and address mapping tables. Volume-Pool Mapping Table 100-1 stores a list of mappings from the volume address to the pool address. Pool-Volume Mapping Table 100-2 stores a list of mappings from the pool address to the volume address. Local storage device 100a can maintain one or more volumes 100-V and a pool 100-P such as a thin pool.

Figure 1C:
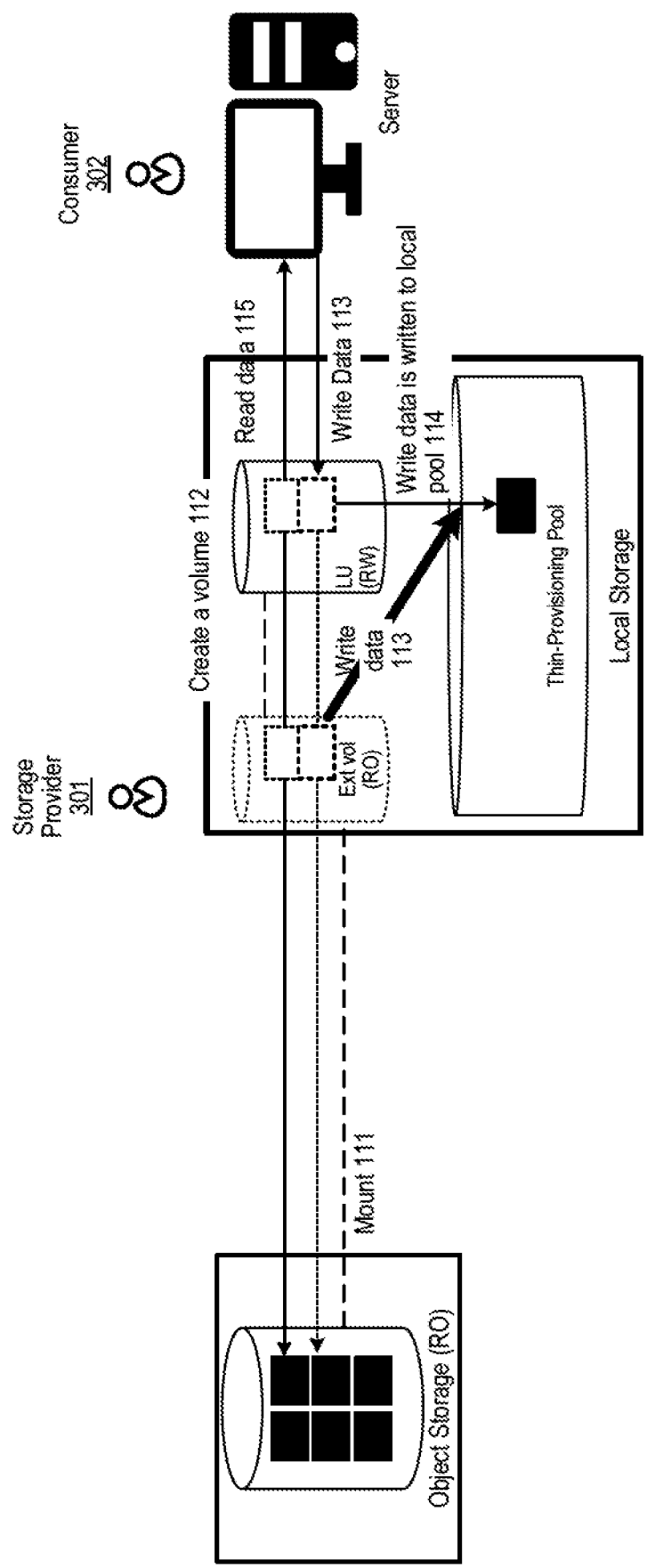
FIG. 1(C) illustrates an example of a write operation to a read-only volume, in accordance with an example implementation.

FIG. 1(C) illustrates an example of a write operation to a read-only volume, in accordance with an example implementation. In the example implementation illustrated in FIG. 1(C), the I/O is mounted to an external volume mounted as read-only. When a write operation is conducted to a read-only volume, the write data is stored in another location in storage for access as needed.

At 111, the storage provider 301 mounts an external volume as a read-only (RO) volume. At 112, the consumer 302 requests to create a volume. At 113, the write data is provided to the logical volume of the local storage. If the volume is mounted as read-only, then write data is written to the local pool and the address mapping is thereby changed at 114. Although the local storage and the object storage is illustrated as being separated, they can also be combined as one unit depending on the desired implementation. Further details of this example implementation are provided below. At 115, data is read directly from the external storage.

Figure 1D:
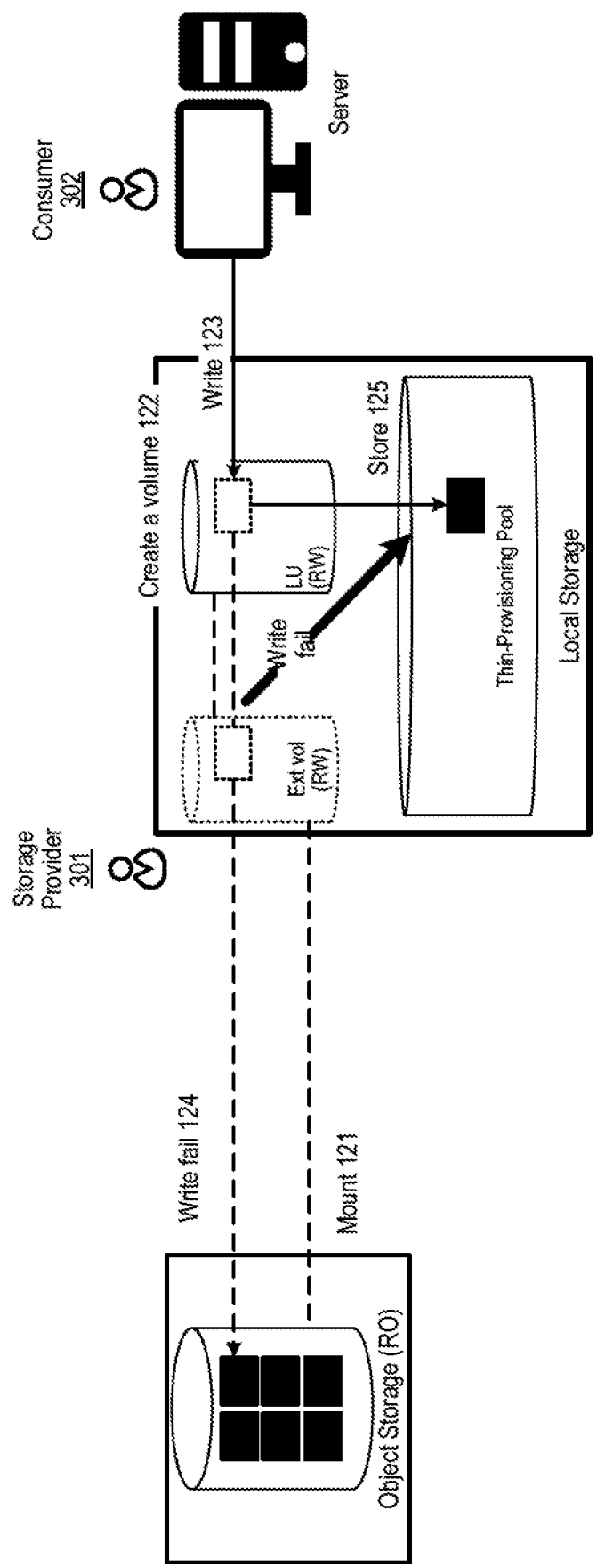
FIG. 1(D) illustrates an example I/O to a read-only external volume, in accordance with an example implementation.

FIG. 1(D) illustrates an example I/O to a read-only external volume, in accordance with an example implementation. Examples of read only external volumes can involve, but are not limited to, a lock of objects for object storage, or a SCSI reservation for a SCSI configuration. At 121, the storage provider 301 mounts a read-only volume. At 122, the consumer 302 requests to create a volume. At 123, the write data is provided to the logical volume of the local storage. However, in this example, the write operation fails because the external storage is set to read-only at 124. Accordingly, at 125, the write data is thereby stored to the local pool due to the inability to write to the volume.

Figure 1E:
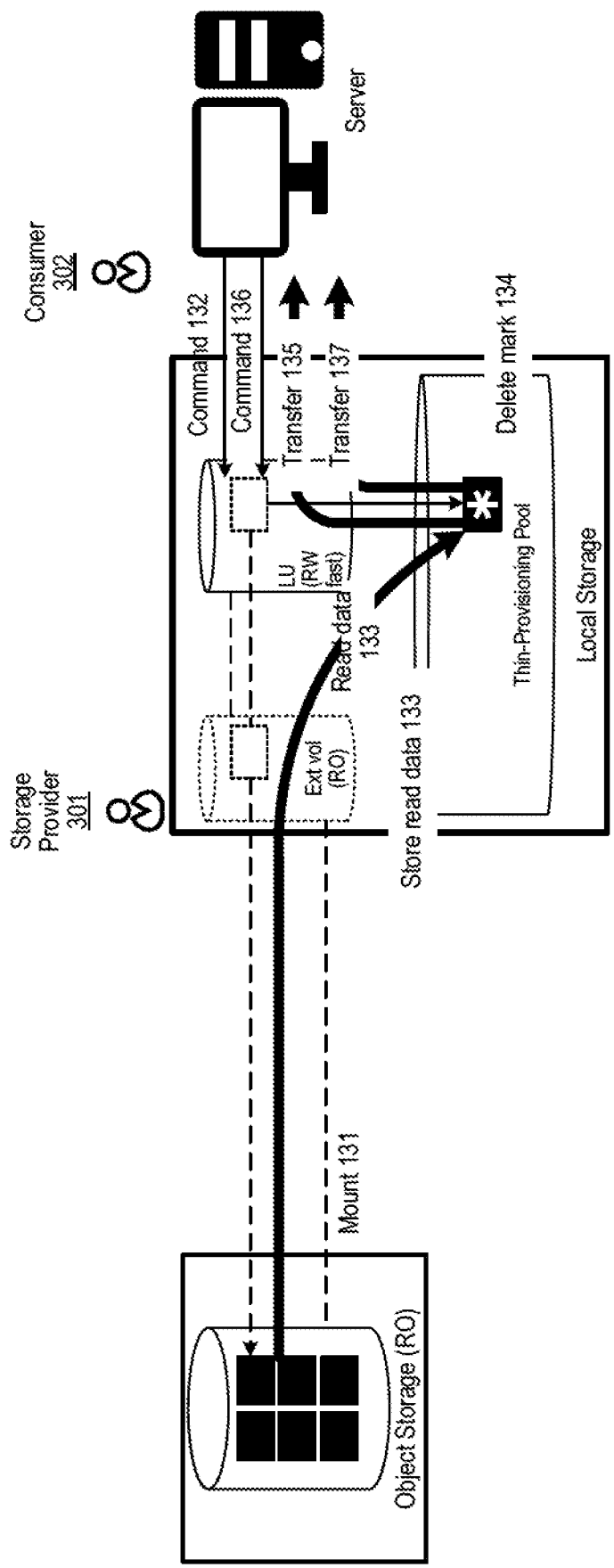
FIG. 1(E) illustrates an example performance improvement of read access to external volumes, in accordance with an example implementation.

FIG. 1(E) illustrates an example performance improvement of read access to external volumes, in accordance with an example implementation. Read data is also stored to a local pool.

At 131 the storage provider 301 mounts an external volume. At 132, a command from the consumer 302 is read. That is, the consumer 302 sends a request to create a volume, and the local storage creates a volume with special attributes.

At 133, the read data is provided and stored to the thin pool, and the mapping to the read data is changed accordingly. The local storage stores read data to the local pool. At 134, a delete-ready mark is assigned to the read data. At 135, the data is transferred to the consumer 302.

At 136, when a second and subsequent read command is issued, the data can then be transferred from the local pool to the consumer 302 to satisfy the command, as shown at 137.

Figure 1F:
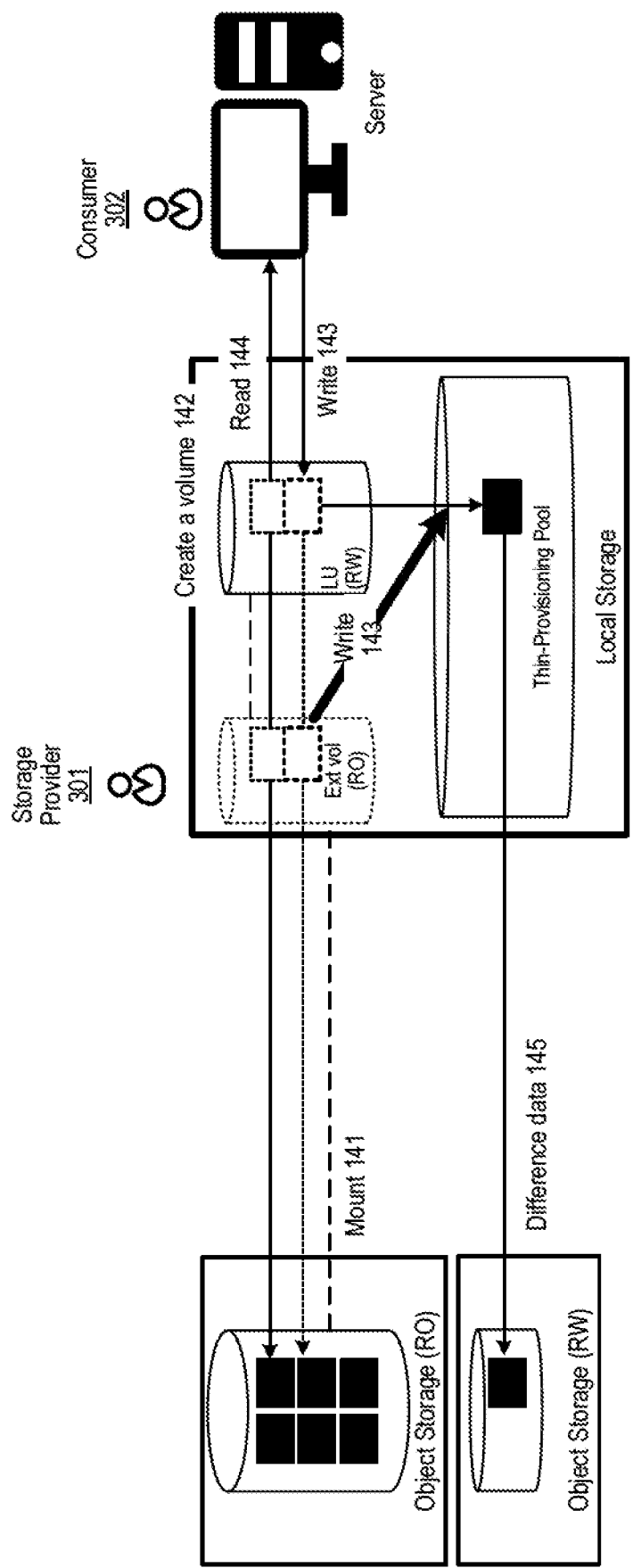
FIG. 1(F) illustrates an example differential update of backup data, in accordance with an example implementation.

FIG. 1(F) illustrates an example differential update of backup data, in accordance with an example implementation. In the example implementation of FIG. 1(F), the systems and methods can write back locally stored difference data, along with metadata, to a different volume on the destination storage.

At 141 the storage provider 301 mounts an external volume. At 142, the consumer 302 requests to create a volume. At 143, the write data is provided to the logical volume of the local storage. At 144, if the written data is desired to be read, then the data stored in the logical volume is provided to satisfy the read command. At 145, the difference data and metadata (e.g., indicating when and where the difference data is) is stored.

Figure 1G:
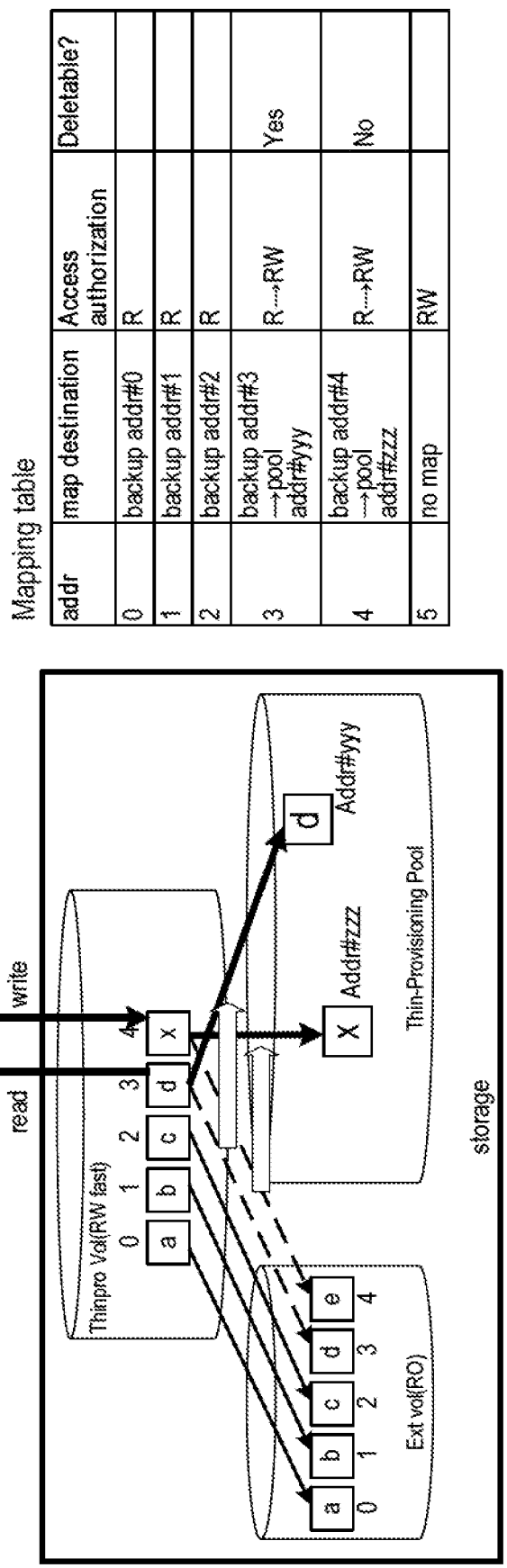
FIG. 1(G) illustrates an example image of switching address mapping, in accordance with an example implementation.

FIG. 1(G) illustrates an example image of switching address mapping, in accordance with an example implementation. In the example implementation illustrated in FIG. 1(G), the systems and methods can automatically create a special thin volume when creating a volume from an external volume. For special thin volumes, the default value in the mapping table is the address of the volume to which it is bound. As illustrated in FIG. 1(G), the mapping table can include, but is not limited to, address, mapping destination, access authorization (e.g., read only, read write), and whether the data is deletable.

Figure 2:
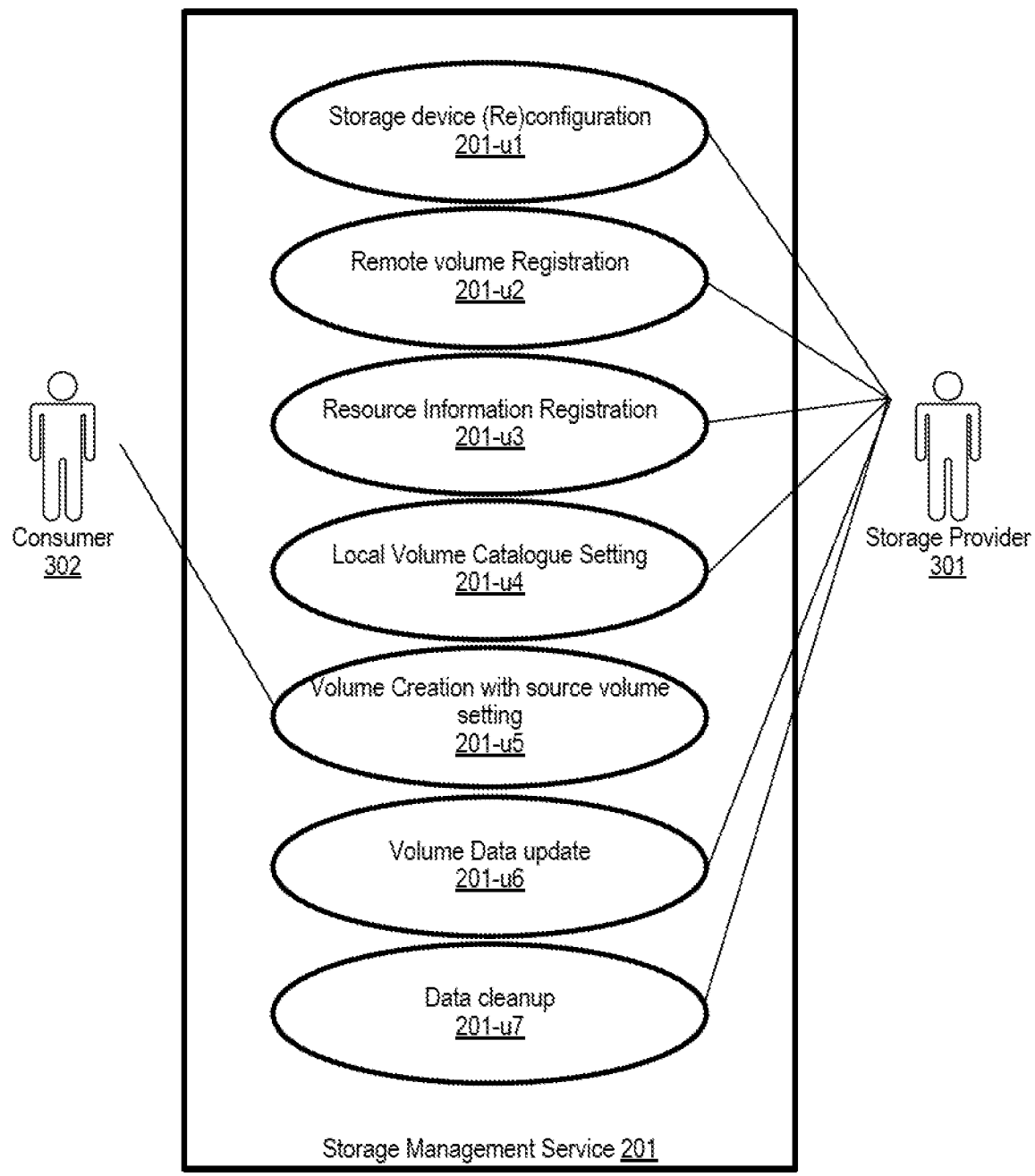
FIG. 2 illustrates an example use case diagram for storage management service, in accordance with an example implementation.

FIG. 2 illustrates an example use case diagram for storage management service 200-1, in accordance with an example implementation.

Storage provider 301 can execute the following functions. Storage device configuration **201-*u*1 is a function in which storage provider 301** performs drive installation on storage devices, pool configuration, network configuration for hosts, and so on. It may be reconfigured as system requirements change.

Remote volume registration **201-*u*2 is a function in which storage provider 301** performs network settings between storage devices between sites and registers volumes which will be reused from other storage devices, and so on. It may be reconfigured as system requirements change.

Resource Information Registration **201-*u*3 is a function in which storage provider 301 registers available capacity, capacity threshold, and so on. This operation can be done by automatic generation from the system configuration, rather than by manual input by the provider. Storage provider 301** can change parameters when there is a change in system.

Local Volume Catalogue Setting **201-*u*4 is a function in which storage provider 301** registers the service name and corresponding capacity and reuse policies.

Volume Data Update **201-*u*6 is a function in which storage provider 301 performs synchronization from local storage devices to data cleanup 201-*u*7. Data cleanup 201-*u*7 is a function in which storage provider 301** performs cleanup data of the storage device. This operation can be done by detecting exceeding the capacity threshold by system.

Storage consumer 302 can also execute the following functions. Volume Creation with source volume setting **201-*u*5 is a function in which consumer 302** selects from the offered storage services the one which is suitable for his use and expense, and create the volume.

FIG. 3 illustrates an example screen interface that Storage Management Service 200-1 displays to Storage Provider 301 for Remote Volume Registration 201-2, in accordance with an example implementation.

This is a screen image that Storage Management Service 200-1 displays to Storage Provider 301 for Remote Volume Registration **201-*u*2. This screen interface displays the information stored in Remote Volume Catalogue 200-2 and accepts edits in accordance with the desired implementation. Remote Volume Catalogue 200-2 manages the list of the volumes that will be reused from other storage devices. It includes volume name 200-2-1, capacity 200-2-2, attribute 200-2-3, the name of the site 200-2-4, the name of the storage device 200-2-5, and so on in accordance with the desired implementation. Volume name 200-2-1 is a unique name in the system. Capacity 200-2-2 indicates the total capacity of the volume. Attribute 200-2-3 indicates the characteristic of the volume. Sites 200-2-4 indicates that the name of the site where the volume was created. Storage Device 200-2-5** indicates that the name of the storage device where the volume was created.

FIG. 4 illustrates an example screen interface that Storage Management Service 200-1 displays to Storage Provider 301 for Service Catalogue Setting 201-04, in accordance with an example implementation.

This screen interface displays the information stored in 200-2 and accepts edits. Service Catalogue 200-3 manages the list of storage volume provisioning service tied to the Service Name 200-3-1, and includes Unit Price 200-3-2, Unit Capacity 200-3-3, Reuse Remote Volume flag 200-3-4, Remote Volume Name 200-3-5, The name of the site 200-3-6, Local Pool identifier (ID) 200-3-7, and Store Read Data Flag 200-3-8.

Service Name 200-3-1 is a unique name in the system. Unit Price 200-3-2 indicates the cost that will be incurred when one unit of the service is purchased. Unit Capacity 200-3-3 indicates the capacity that will be provided when one unit of the service is purchased. Reuse Remote Volume Flag 200-3-4 indicates whether the service reuses existing volume or not. Remote Volume Name 200-3-5 indicates that the name of the reuse volume when one unit of the service is purchased. The name of the site 200-3-6 is a unique identifier of the site where this type of volume will be created. Local Pool ID 200-3-8 is a unique identifier of the storage pool in the storage device. Store Read Data Flag 200-3-9 indicates whether the store read data in the pool or not.

Figure 5:
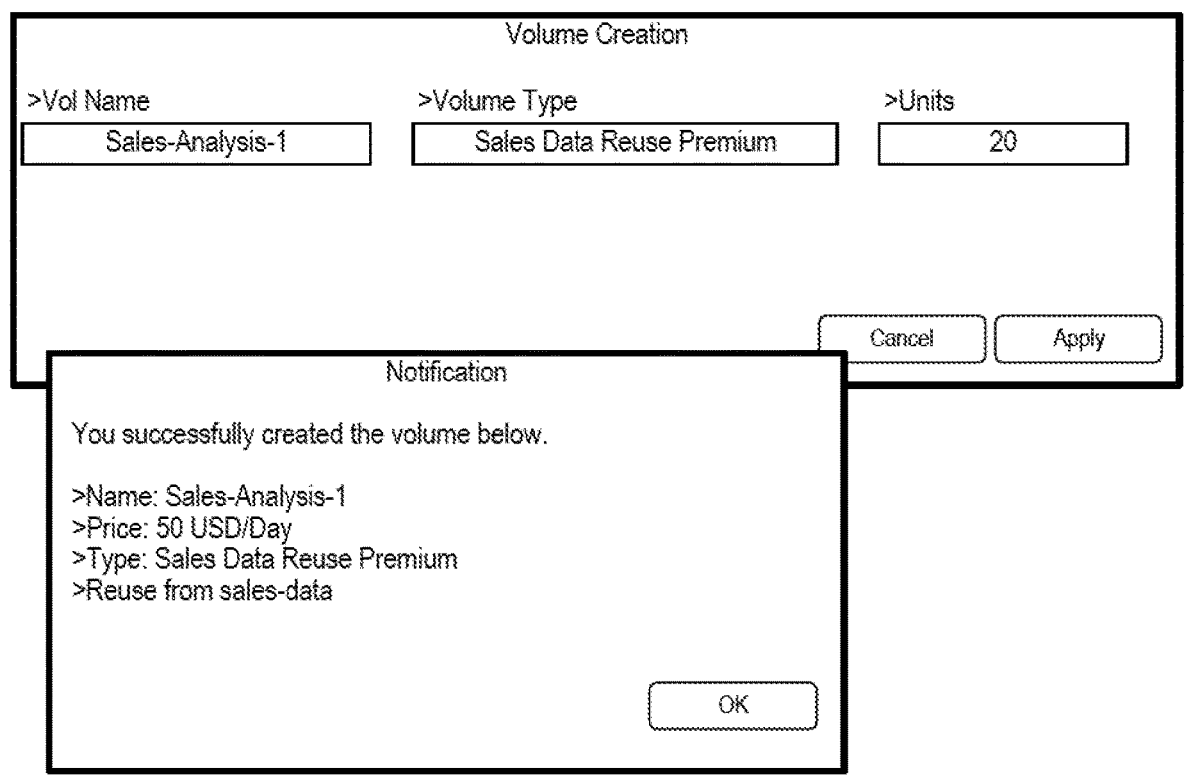
FIG. 5 illustrates an example screen interface displayed by the Storage Management Service to the Consumer to ask them to enter the settings for the volume to be purchased for Volume Creation, in accordance with an example implementation.

FIG. 5 illustrates an example screen interface displayed by the Storage Management Service 200-1 to the Consumer 302 to ask them to enter the settings for the volume to be purchased for Volume Creation **201-*u*5**, in accordance with an example implementation.

Consumer 302 names the individual volume, selects a type from the information provided in the volume catalog, and enters the number of units to be set for the storage device 100*a*. If the volume is successfully created, the name, total price, the type, and the reuse volume name are displayed.

FIG. 6 illustrates example databases for managing information on storage system configurations and resources managed by the storage service, in accordance with an example implementation. Volume Database 200-4 stores information of the volume. The fields for volume database 200-4 can include, but is not limited to, ID 200-4-1, Volume Name 200-4-2, Type Name 200-4-3, the number of purchased units 200-4-4, the name of the site where the volume was created 200-4-5, the name of the storage device where the volume was created 200-4-6, the pool ID 200-4-7, and so on. The entries for the volume database 200-4 are created by Consumer 302 through volume creation operations.

Storage Resource Database 200-5 stores information of the storage devices and its usage. The fields for storage resource database 200-5 can include, but is not limited to, Storage Device Name 200-5-1, max capacity of the storage device 200-5-2, used capacity of the storage device 200-5-3, capacity warning threshold of the storage device 200-5-4, the name of the site 200-5-5 where the storage device placed, and so on. If used capacity 200-5-3 exceeds capacity warning threshold 200-5-4, the storage management service 200-1 sends a warning to the user.

FIG. 7 illustrates tables for managing information of the mapping between the volume address and the location of data, in accordance with an example implementation. Volume-Pool Mapping Table 100-1 stores information such as, but not limited to, Volume Name 100-1-1, Volume Address 100-1-2, Attribute 100-1-3, Mapping Destination name 100-1-4, Mapping Destination Type 100-1-5, Mapping Destination Address 100-1-6, Disposable Flag 100-1-7, and so on.

Volume Name 100-1-1 is a unique identifier of the volume. Volume Address 100-1-2 is a unique location identifier of the volume. Attribute 100-1-3 indicates the characteristic of the address. Mapping Destination Name 100-1-4 indicates the name of the place where data is stored. Mapping Destination Type 100-1-5 indicates the data location whether "Remote" or "Local". Mapping Destination Address 100-1-6 indicates the address where data is stored. Disposable Flag 100-1-7 indicates whether the data on the address is disposable or not. If the disposable flag 100-1-7 is Yes, the data is a copy of the data on source volume and original data remains on the source volume.

Pool-Volume Mapping Table 100-2 stores information such as, but not limited to, Pool ID 100-2-1, Pool Name 100-2-2, Pool Address 100-2-3, Volume Name 100-2-4, Volume Address 100-2-5. Disposable Flag 100-2-6, and so on.

Pool ID 100-2-1 is a unique identifier of the pool. Pool Name 100-2-2 is a unique name of the pool. Pool Address 100-2-3 is a unique location identifier of the pool. Volume Name 100-2-4 indicates the name of the volume which uses the pool address. Volume Address 100-2-5 indicates the address of the volume which is mapped to the pool address. Disposable Flag 100-2-6 indicates whether the data on the address is disposable or not. If disposable flag 100-2-6 is Yes, then the data is a copy of the data and original data remains on the source volume.

Figure 8:
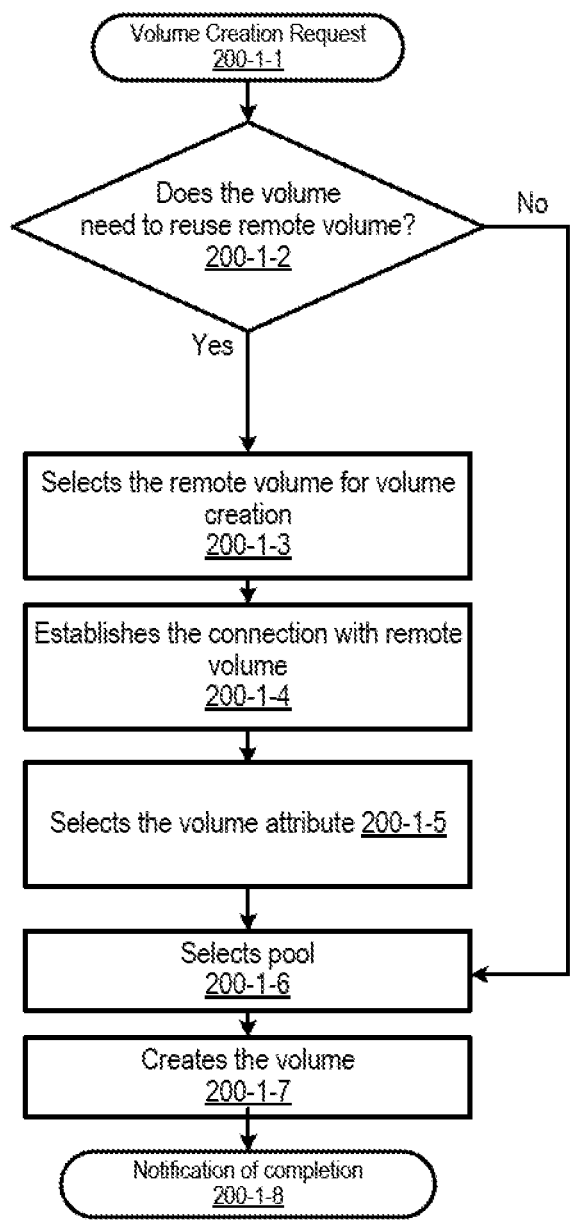
FIG. 8 illustrates an example processing flow in Storage Management Service when a volume creation request is issued, in accordance with an example implementation.

FIG. 8 illustrates an example processing flow in Storage Management Service 200-1 when a volume creation request is issued in 201-u5, in accordance with an example implementation.

At Step 200-1-1 the program is invoked upon receipt of a volume creation request. At Step 200-1-2, the program checks if the requested volume requires to reuse another volume. If not (No) then the flow proceeds to 200-1-6, otherwise (Yes), then the flow proceeds to 200-1-3. At Step 200-1-3, to determine which volume to reuse, the program refers to the source volume catalogue 200-2 and volume catalogue 200-3. Then, the program selects the source volume.

At Step 200-1-4, to establish the connection with source volume, the program refers to the source volume catalogue 200-2. At Step 200-1-5, to determine which volume attribute is used, the program refers to the source volume catalogue 200-2 and volume catalogue 200-3. Then, the program selects the pool at 200-1-6.

At Step 200-1-7 the program registers the volume information to the Volume Database 200-3 and the Mapping Table 100-1. At Step 200-1-8, the program notifies the consumer of the volume creation completion.

Figure 9:
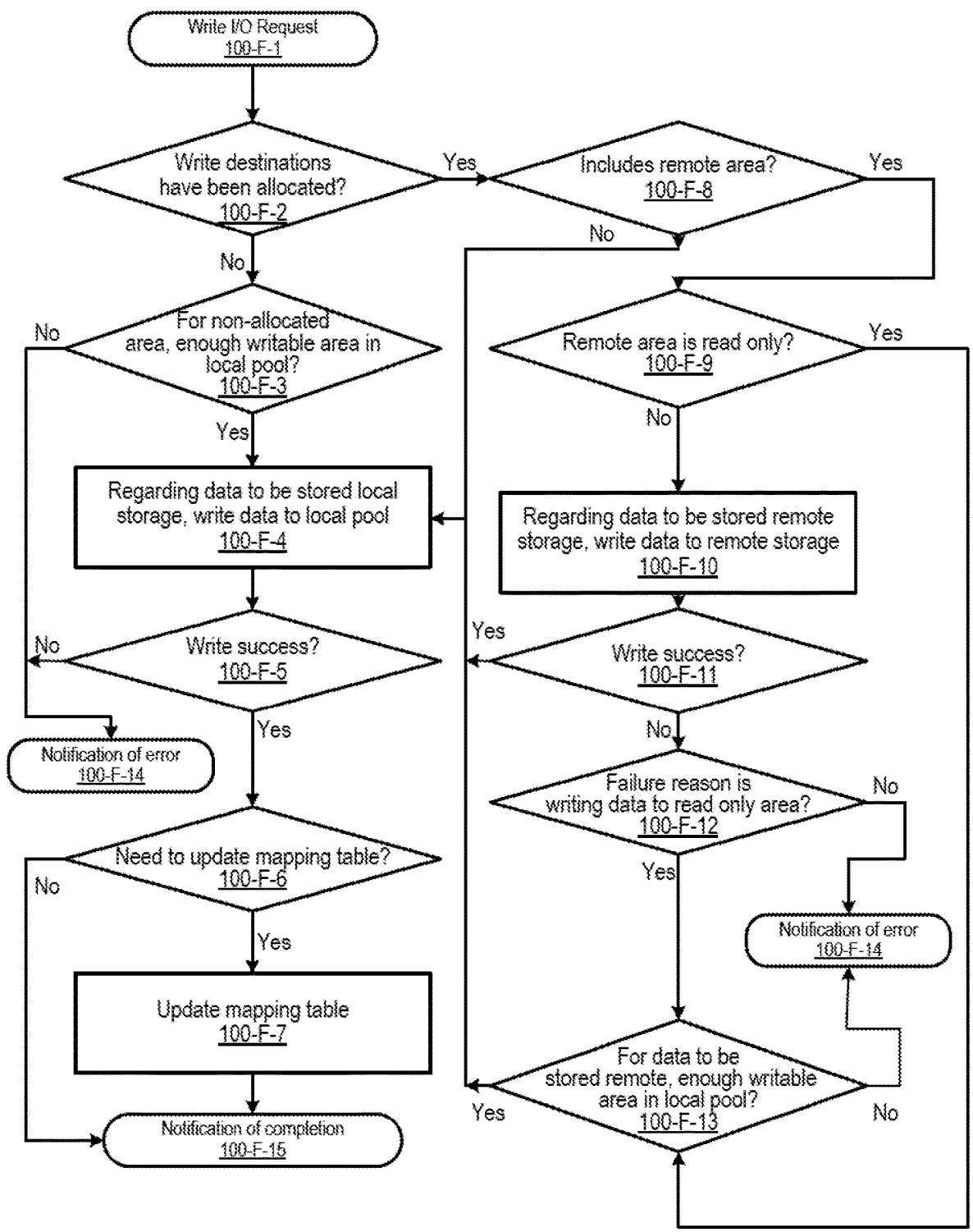
FIG. 9 illustrates an example processing flow in Storage device when a write I/O request is issued from servers, in accordance with an example implementation.

FIG. 9 illustrates an example processing flow in Storage device 100a when a write I/O request is issued from servers, in accordance with an example implementation. At Step 100-F-1, this program is invoked upon receipt of a write I/O request. At Step 100-F-2, to determine whether the address range requested for the write I.O has a mapping or not, the program refers Volume-Pool Mapping Table 100-1. At Step 100-F-3, to obtain enough writable addresses, the program refers to Pool-Volume Mapping Table 100-2. If the program fails to obtain enough writeable addresses, then the program sends a failure notification to the requestor. Writable addresses are either unused addresses or where the Disposable Flag is Yes.

At Step 100-F-4, to determine where to write, the program refers to Volume-Pool Mapping Table 100-1 and then writes data. At Step 100-F-5, the program checks if the write I/O finished successfully. If so (Yes), the program proceeds to Step 100-F-6, otherwise (No) the program proceeds to Step 100-F-14.

At Step 100-F-6, to determine whether the program need to update Volume-Pool Mapping Table 100-1 and Pool-Volume Mapping table 100-2 or not. If so (Yes), the program proceeds to Step 100-F-7, otherwise (No) the program proceeds to Step 100-F-15.

At Step 100-F-7, the program updates Volume-Pool Mapping Table 100-1 and Pool-Volume Mapping Table 100-2. For the Volume-Pool Mapping Table 100-1, at the row of the write address, the program sets "read/write" to Attribute 100-1-3, "No" to Disposable flag 100-1-7. For the Pool-Volume Mapping Table, at the row of the write address which is obtained at Step 100-F-3, the program sets Volume Name 100-2-4, Volume Address 100-2-5. "No" to Disposable Flag 100-2-6.

At Step 100-F-8, a check is made by the program to determine whether the write address has an address range mapped to the remote volume. If so (Yes), then the program proceeds to Step 100-F-9, otherwise (No) the program proceeds to Step 100-F-4.

At Step 100-F-9, a check is made by the program to determine whether the write address range is only in a read only area by referring to Volume-Pool Mapping Table 100-1. If so (Yes), then the program proceeds to Step 100-F-13, otherwise (No) the program proceeds to Step 100-F-10.

At Step 100-F-10, to determine where to write, the program refers to Volume-Pool Mapping Table 100-1 and then writes data. At Step 100-F-11, the program checks if the write I/O finished successfully. If so (Yes), the program proceeds to Step 100-F-4, otherwise (No) the program proceeds to Step 100-F-12.

At Step 100-F-11, a check is made by the program to determine whether the reason of write failure is that destination is read-only or not. If so (Yes), then the program proceeds to Step 100-F-13, otherwise (No) the program proceeds to Step 100-F-14.

At Step 100-F-12, the program checks if the cause of the write failure is that the destination is read only. If the destination is read only (Yes), the program processes write I/O as the same of the request including read only area and proceeds to Step 100-F-13. This can occur because these storage devices 100a and 100b are different devices and are configurable independently. Otherwise (No), the program proceeds to Step 100-F-14.

At Step 100-F-13, to obtain enough writable addresses, the program refers to Pool-Volume Mapping Table 100-2. If the program fails to obtain enough writeable addresses, then notifies failure to the requestor. Writable addresses are either unused addresses or where the Disposable Flag is Yes.

At Step 100-F-14, the program notifies the I/O requestor server of the failure of write I/O.

At Step 100-F-15, the program notifies the I/O requestor server of the success of write I/O.

Figure 10:
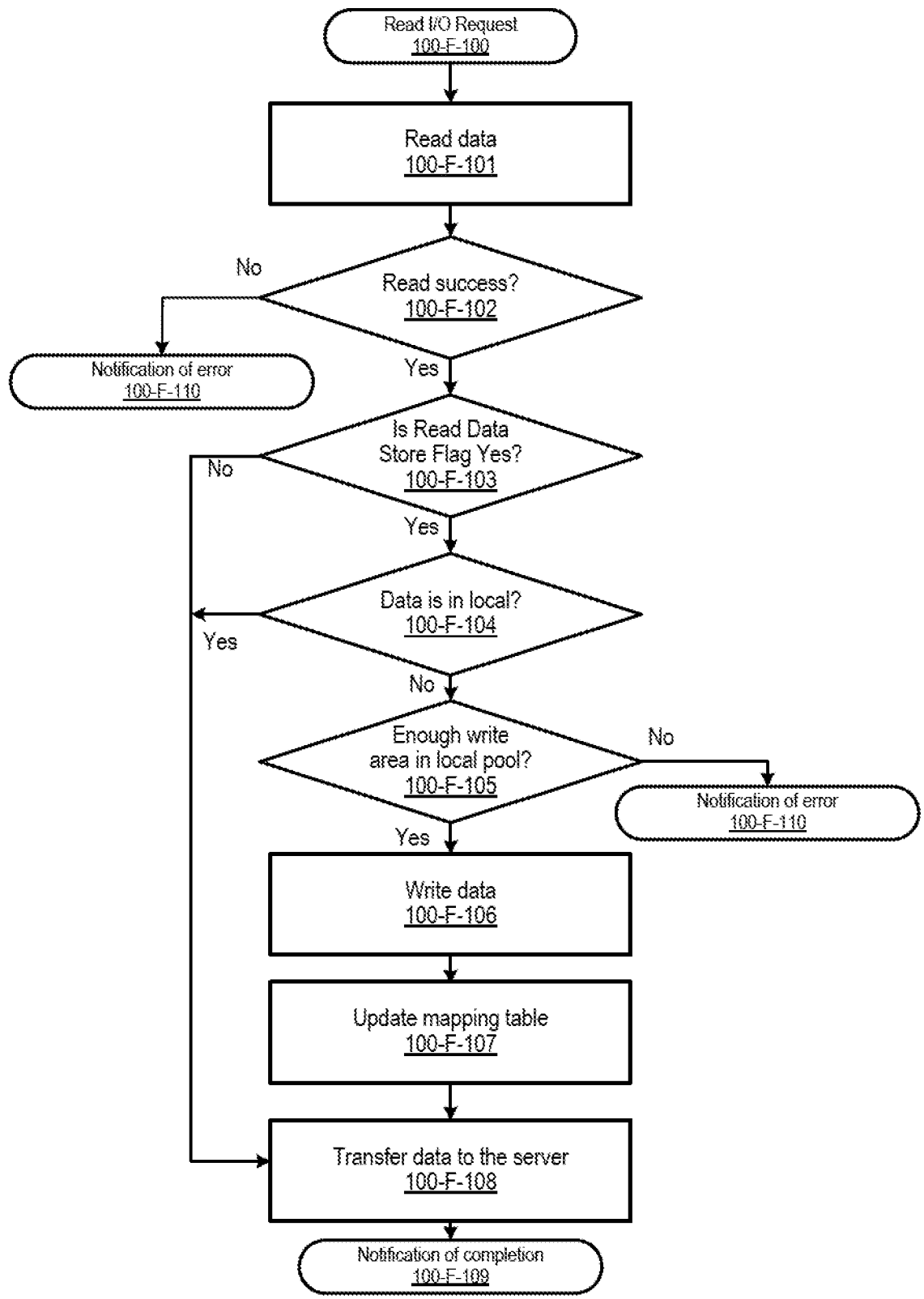
FIG. 10 illustrates the example processing flow in Storage Device when a read IO request is issued from servers, in accordance with an example implementation.

FIG. 10 illustrates the example processing flow in Storage Device 100*a* when a read I/O request is issued from servers, in accordance with an example implementation. At Step 100-F-100, this program is invoked upon receipt of a read I/O request. At Step 100-F-101, to determine where to read, the program refers to Volume-Pool Mapping Table 100-1 and then reads the data. At Step 100-F-102, the program checks if the program finishes the read operation successfully.

At Step 100-F-103, the program determines whether the Read Data Store Flag of the volume is Yes by referring to Volume Database 200-3 and Volume Catalogue 200-2. If so (Yes), then the program proceeds to 100-F-104, otherwise (No) the program proceeds to Step 100-F-109.

At Step 100-F-104, the program determines whether the read data is stored in local pool by referring to Volume-Pool Mapping Table 100-1. If so (Yes), then the program proceeds to Step 100-F-105, otherwise (No), the program proceeds to Step 100-F-109.

At Step 100-F-105, to obtain enough writable addresses, the program refers to Pool-Volume Mapping Table 100-2 to determine whether there is enough write area in a local pool. Writable addresses are either unused addresses or where Disposable Flag is Yes. If so (Yes) then the flow proceeds to 100-F-106 to write the data, otherwise (No) the flow proceeds to 100-F-110 to send an error notification. At Step 100-F-106, the program determines where to write by referencing Volume-Pool Mapping Table 100-1 and then writes data.

At Step 100-F-107, the program updates Volume-Pool Mapping Table 100-1 and Pool-Volume Mapping Table 100-2 as follows. With regards to Volume-Pool Mapping Table 100-1, at the row of the read address, the program sets "read only" to Attribute 100-1-3, the pool name to Mapping Destination Name 100-1-4, "Local" to Mapping Destination Type 100-1-5, the pool address to the Mapping Destination Address 100-1-6, and "Yes" to Disposable flag 100-1-7. With regards to Pool-Volume Mapping Table 100-2, at the row of the read address which is obtained from Step 100-F-101, the program sets Volume Name 100-2-4, Volume Address 100-2-5, "Yes" to Disposable Flag 100-2-6.

At Step 100-F-108, the program sends read data to the server.

At Step 100-F-109: the program notifies the I/O requestor server of the failure of read I/O. At Step 100-F-110, the program notifies the V/O requestor server of the success of read I/O.

Figure 11:
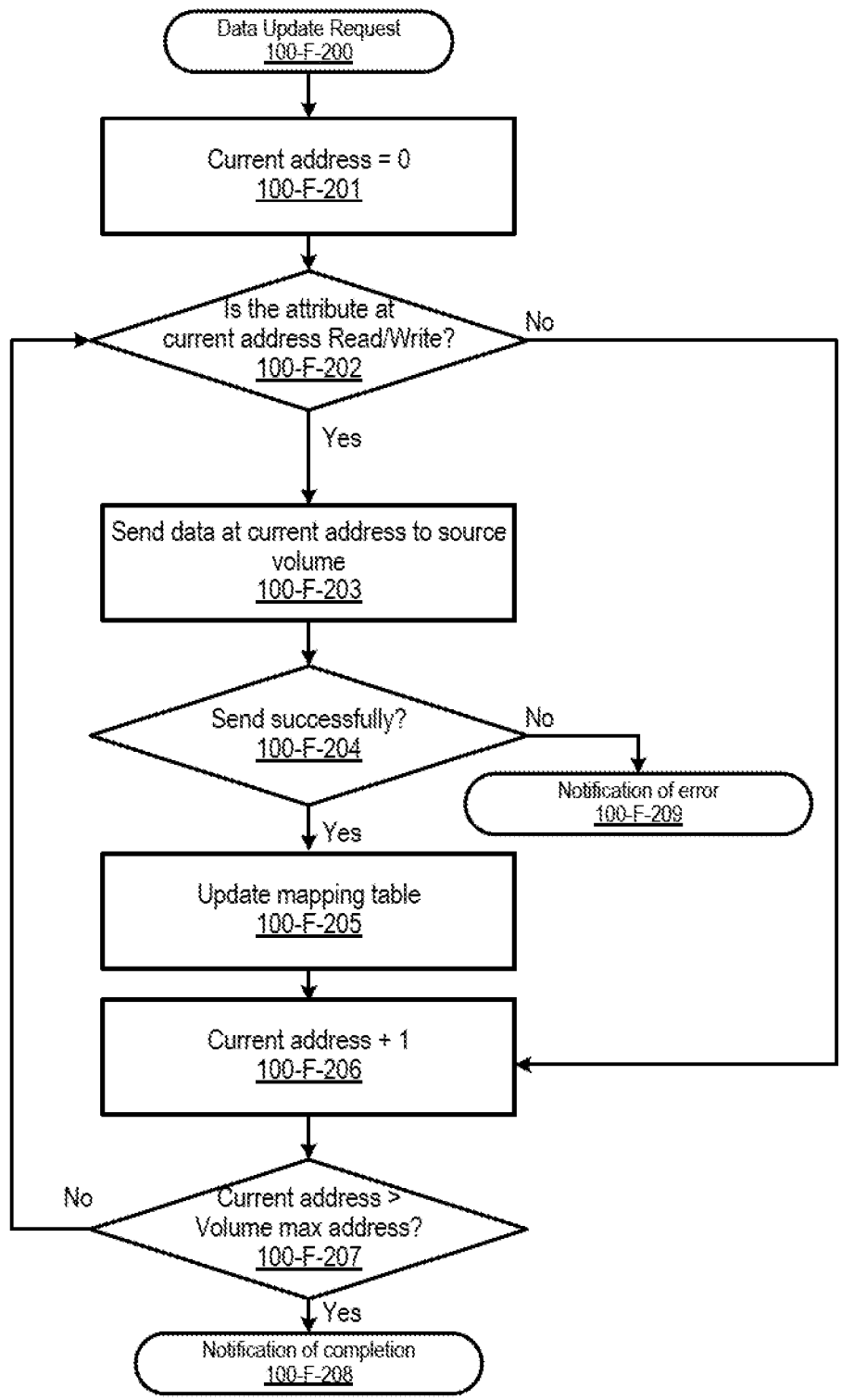
FIG. 11 illustrates an example of the processing flow in Storage Device when data update request is issued by Consumer through Storage Management Service, in accordance with an example implementation.

FIG. 11 illustrates an example of the processing flow in Storage Device 100*a* when data update request is issued by Consumer 203 through Storage Management Service 200, in accordance with an example implementation.

At Step 100-F-200, this program is invoked upon receipt of volume data update request. At Step 100-F-201, to search the not-yet-updated address, the program sets current volume address as 0.

At Step 100-F-202, the program determines whether the current address is updated or not by referencing Volume-Pool Mapping Table 100-1. If the attribute of the current address is Read/Write (Yes), then the current address is not yet updated and the program proceeds to 100-F-203, otherwise (No) the program proceeds to Step 100-F-205.

At Step 100-F-203, the program sends data at the current address to the source volume. At Step 100-F-204, a determination is made as to whether the send was successful. If so (Yes), then the flow proceeds to 100-F-205, otherwise (No) the flow proceeds to 100-F-209.

At Step 100-F-205, the program updates Volume-Pool Mapping Table 100-1 and Pool-Volume Mapping Table 100-2. With regards to Volume-Pool Mapping Table 100-1, at the row of the current address, the program sets "read only" to Attribute 100-1-3 and "Yes" to Disposable flag 100-1-7. With regards to Pool-Volume Mapping Table 100-2, at the row of the current address, the program sets "Yes" to Disposable Flag 100-2-6.

At Step 100-F-206, the program updates the current address to the next address.

At Step 100-F-207, the program determines whether the current address is larger than the maximum address of the volume by referencing Volume-Pool Mapping Table 100-2. If so (Yes) then the program proceeds to 100-F-208, otherwise (No) the program proceeds to 100-F-202.

At Step 100-F-208, the program notifies Consumer 302 of update completion.

Figure 12:
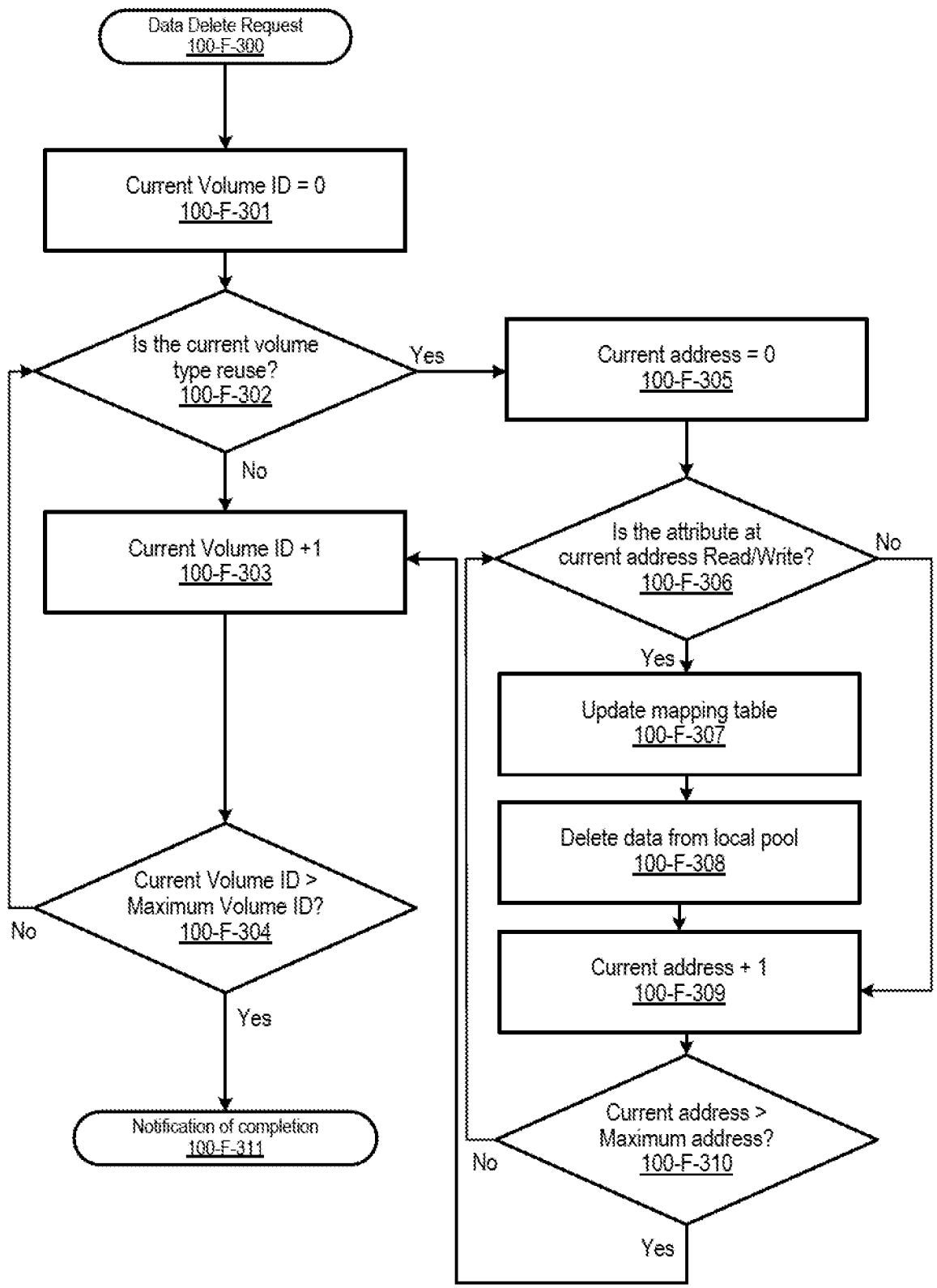
FIG. 12 illustrates an example processing flow in Storage Device when data cleaning request is issued by Provider through Storage Management Service, in accordance with an example implementation.

FIG. 12 illustrates an example processing flow in Storage Device 100*a* when data cleaning request is issued by Provider 201 through Storage Management Service 200, in accordance with an example implementation. This operation can be done by detecting an excess of the threshold 200-5-4 of the Used Capacity 200-5-3, rather than by manual input by the provider.

At Step 100-F-300, the program is invoked upon receipt of data cleaning request. At Step 100-F-301, to search a not-yet-cleaned volume, the program sets current volume ID as 0.

At step 100-F-302, to determine whether the current volume has a source volume, the program refers to Volume Database 200-3. If the current volume has a source volume, it is not reusable (No) and the program proceeds to 100-F-303, otherwise (Yes), the program proceeds to 100-F-305.

At Step 100-F-303, the program updates the current volume ID to the next Volume ID.

At Step 100-F-304, the program determines whether the current volume ID is larger than the maximum ID of the volume by referencing Volume Database 200-3. If so (Yes), then the program proceeds to step 100-F-311, otherwise (No) the program proceeds to step 100-F-302.

At Step 100-F-305, to search a not-yet-cleaned volume address, the program sets current volume address as 0. At Step 100-F-306, the program determines that the current address is cleaned or not by referencing Volume-Pool Mapping Table 100-2. If the Disposable flag is No, then the data on the address is cleaned. Thus, if the current address has the read/write attribute (Yes) then the program proceeds to 100-F-307, otherwise (No) the program proceeds to 100-F-309.

At Step 100-F-307, the program updates Volume-Pool Mapping Table 100-1 and Pool-Volume Mapping Table 100-2 as follows. For the Volume-Pool Mapping Table 100-2, at the row of the current address, the program sets "read only" to Attribute 100-1-3, the source volume name to Mapping Destination Name 100-1-4, "external source" to Mapping Destination Type 100-1-5, and "No" to Disposable flag 100-1-7. For the Pool-Volume Mapping Table 100-2, at the row of the current address, the program sets "unused" to Volume Name 100-2-4, Volume Address 100-2-5, Disposable Flag 100-2-6.

At Step 100-F-308, to obtain the address of the data having the Disposable Flag of Yes, the program references Volume-Pool Mapping Table 100-2. Then, the program deletes data from the pool.

At Step 100-F-309, the program updates the current address to the next address. At Step 100-F-310, to determine whether the current address is larger than the maximum address of the volume, the program references Volume-Pool Mapping Table 100-2. If the current address is greater than the maximum address (Yes), then the program proceeds to Step 100-F-303, otherwise (No) the program proceeds to Step 100-F-306.

At Step 100-F-311, the program notifies the Provider 301 of the cleaning completion.

Through the example implementation described herein, there can be immediate I/O available without destroying the data stored in external volumes.

Figure 13:
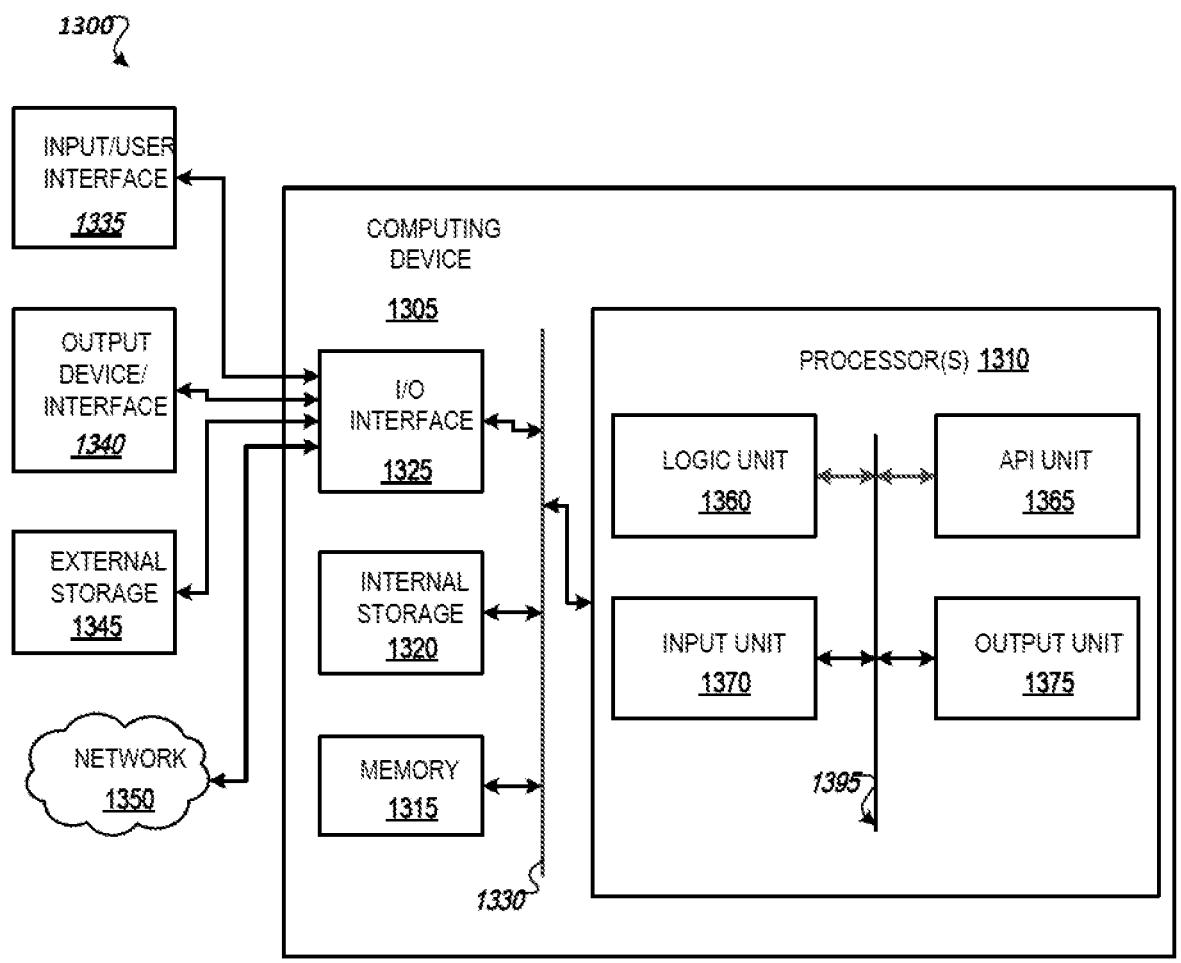
FIG. 13 illustrates an example computing environment with an example computer device suitable for use in some example implementations.

FIG. 13 illustrates an example computing environment with an example computer device suitable for use in some example implementations, such as a first storage system such as remote storage device 100*b*, second storage system such as local storage device 100*a*, or server 200. Local storage device 100*a* can be configured to facilitate local storage as illustrated in FIGS. 1(C) to 1(G), and remote storage device 100*b* can be used to implement object storage as illustrated in FIGS. 1(C) to 1(G). Computer device 1305 in computing environment 1300 can include one or more processing units, cores, or processors 1310, memory 1315 (e.g., RAM. ROM, and/or the like), internal storage 1320 (e.g., magnetic, optical, solid-state storage, and/or organic), and/or IO interface 1325, any of which can be coupled on a communication mechanism or bus 1330 for communicating information or embedded in the computer device 1305. IO interface 1325 is also configured to receive images from cameras or provide images to projectors or displays, depending on the desired implementation.

Computer device 1305 can be communicatively coupled to input/user interface 1335 and output device/interface 1340. Either one or both of the input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via IO interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

IO interface 1325 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks. Blu-ray disks), solid-state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided. Processor(s) 1310 can be in the form of hardware processors such as central processing units (CPUs) or in a combination of hardware and software units.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, the input unit 1370, the output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide an output based on the calculations described in example implementations.

Processor(s) 1310 can be configured to execute a method or instructions, which can involve for receipt of a write request from a server to a first storage system associated with a mounted volume having an attribute of read only or read/write, the write request processed by a second storage system, setting the write destination of write data associated with the write request to the first storage system or the second storage system based on the attribute as illustrated in FIGS. 1(B) to 1(G) and FIGS. 8 to 12. Such a setting can be conducted by the second storage system, and can be local to the server depending on the desired implementation.

Depending on the desired implementation, the second storage system can set the write destination to the second storage for when the attribute is read only as illustrated in FIG. 1(C) and FIG. 9.

Depending on the desired implementation, the second storage system can set the write destination to the first storage for when the attribute is read/write as illustrated in FIGS. 1(D), FIG. 11, and FIG. 12.

Processor(s) 1310 can be configured to execute the method or instruction as described above, and further involve, for the second storage system receiving a write failure in response to writing the write data to the first storage system, setting the write destination to the second storage as described in FIG. 1(D) and FIG. 9.

Processor(s) 1310 can be configured to execute the method or instructions as described above, and further involve, for receipt of a read request from the server to the first storage system, storing read data associated with the read request in the second storage system; and providing the read data to the server as described in FIG. 1(F) and FIG. 10.

Depending on the desired implementation, the stored read data is marked as delete ready as illustrated in FIG. 1(E).

Processor(s) 1310 can be configured to execute the method or instructions as described above, and further involve storing, in a third storage system, difference data for the write data and metadata indicating location and time of the difference data as illustrated in FIG. 1(F).

Through the example implementations described herein, it can be possible to access data with data retention at the time of storage of the data, so as to make such data instantly available.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating." "determining," "displaying." or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information.

A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for dynamically managing write requests in a cloud storage environment, the method comprising:
 receiving, by a second storage system, a write request from a server to a first storage system that is associated with a mounted volume and has an attribute of read only or read/write;
 determining a current state of the mounted volume by checking a Volume-Pool Mapping Table that stores mappings from volume addresses to pool addresses and a Pool-Volume Mapping Table;
 in response to detecting the attribute of the mounted volume as read-only, setting a write destination of write data associated with the write request to a predefined alternative storage location managed by the second storage system, writing the data to a local pool, and changing address mapping, and in response to detecting the attribute as read/write, setting the write destination to the first storage system and writing data directly to a logical volume of the first storage system;
maintaining metadata indicating when and where write data is stored.

2. The method of claim 1, wherein the second storage system sets the write destination to the alternative storage location when the attribute is read only.

3. The method of claim 1, wherein the second storage system sets the write destination to the first storage for when the attribute is read/write.

4. The method of claim 1, further comprising, in response to the second storage system receiving a write failure due to a read-only status of the first storage system, redirecting the write data to the alternative storage system and storing metadata associated with the redirected write data in the alternative storage location.

5. The method of claim 1, further comprising:
receiving, by the second storage system, a read request from the server directed to the first storage system:
storing read data associated with the read request in the alternative storage system; and
providing the read data to the server.

6. The method of claim 5, wherein the second storage system marks the stored read data as delete ready.

7. The method of claim 1, further comprising:
storing, by the second storage system, in a third storage system, difference data for the write data and metadata indicating location and time of the difference data.

8. A non-transitory computer readable medium, storing instructions for executing a process, the instructions comprising:
receiving a write request from a server directed to a first storage system associated with a mounted volume having an attribute of read only or read/write;
processing the write request by a second storage system;
determining a current state of the mounted volume by checking a Volume-Pool Mapping Table that stores mappings from volume addresses to pool addresses and a Pool-Volume Mapping Table;
setting a write destination of write data associated with the write request to the first storage system or an alternative location managed by the second storage system based on the attribute, wherein:
in response to detecting the attribute of the mounted volume as read-only, writing the data to a local pool and changing address mapping, and
in response to detecting the attribute as read/write, writing data directly to a logical volume of the first storage system; and
maintaining metadata indicating when and where write data is stored.

9. The non-transitory computer readable medium of claim 8, wherein the instructions set the write destination to the alternative storage location when the attribute is read only.

10. The non-transitory computer readable medium of claim 8, wherein the instructions set the write destination to the first storage system when the attribute is read/write.

11. The non-transitory computer readable medium of claim 8, wherein the instructions further comprise, in response to receiving a write failure in response to writing the write data to the first storage system, setting the write destination to the alternative storage location.

12. The non-transitory computer readable medium of claim 8, the instructions further comprising:
for receipt of a read request from the server to the first storage system:
storing read data associated with the read request in the second storage system; and
providing the read data to the server.

13. The non-transitory computer readable medium of claim 8, wherein the stored read data is marked as delete ready.

14. The non-transitory computer readable medium of claim 8, the instructions further comprising:
storing, in a third storage system, difference data for the write data and metadata indicating location and time of the difference data.

15. A system, comprising:
a first storage system configured to receive a write request from a server, the write request associated with a mounted volume having an attribute of read only or read/write; and
a second storage system, comprising a processor that is configured to:
receive a write request from a server directed to the first storage system, the write request associated with a mounted volume having an attribute of read-only or read/write;
determine a current state of the mounted volume by checking a Volume-Pool Mapping Table that stores mappings from volume addresses to pool addresses and a Pool-Volume Mapping Table;
process the write request for the first storage system; and
set a write destination of write data associated with the write request to the first storage system or an alternative storage location managed by the second storage system based on the attribute, wherein:
in response to detecting the attribute of the mounted volume as read-only, write the data to a local pool and change address mapping, and
in response to detecting the attribute as read/write, write data directly to a logical volume of the first storage system; and
maintain metadata indicating when and where write data is stored.

16. The method of claim 1, further, wherein the second storage system dynamically determines the write destination of write data based on a current state of the volume's attribute and system conditions, including storage capacity and performance metrics.

17. The method of claim 1, wherein the second storage system updates metadata in real-time as changes occur in the storage destinations, ensuring consistency and data integrity across the storage systems.

18. The non-transitory computer-readable medium of claim 8, wherein the instructions further comprise:
receiving a read request from the server directed to the first storage system;
storing read data associated with the read request in the alternative storage location; and
providing the read data to the server.

19. The non-transitory computer-readable medium of claim 18, wherein the instructions mark the stored read data as delete-ready.

20. The non-transitory computer-readable medium of claim 8, wherein the instructions further comprise storing, in a third storage system, difference data for the write data and metadata indicating the location and time of the difference data.

* * * * *

UNITED STATES PATENT AND TRADEMARK OFFICE
CERTIFICATE OF CORRECTION

| | | |
|---|---|---|
| PATENT NO. | : 12,487,769 B2 | Page 1 of 1 |
| APPLICATION NO. | : 18/207950 | |
| DATED | : December 2, 2025 | |
| INVENTOR(S) | : Takanobu Suzuki, Tomohiro Kawaguchi and Akiyoshi Tsuchiya | |

It is certified that error appears in the above-identified patent and that said Letters Patent is hereby corrected as shown below:

On the Title Page

In Item (72), Line 3 delete "(CA)" and insert --California (US)--.

In Item (72), Line 4 delete "(CA)" and insert --California (US)--.

Signed and Sealed this
Tenth Day of February, 2026

John A. Squires
*Director of the United States Patent and Trademark Office*